April 14, 1959 W. S. MORTLEY 2,882,394
FREQUENCY CHANGING CIRCUIT ARRANGEMENTS
Filed May 6, 1957
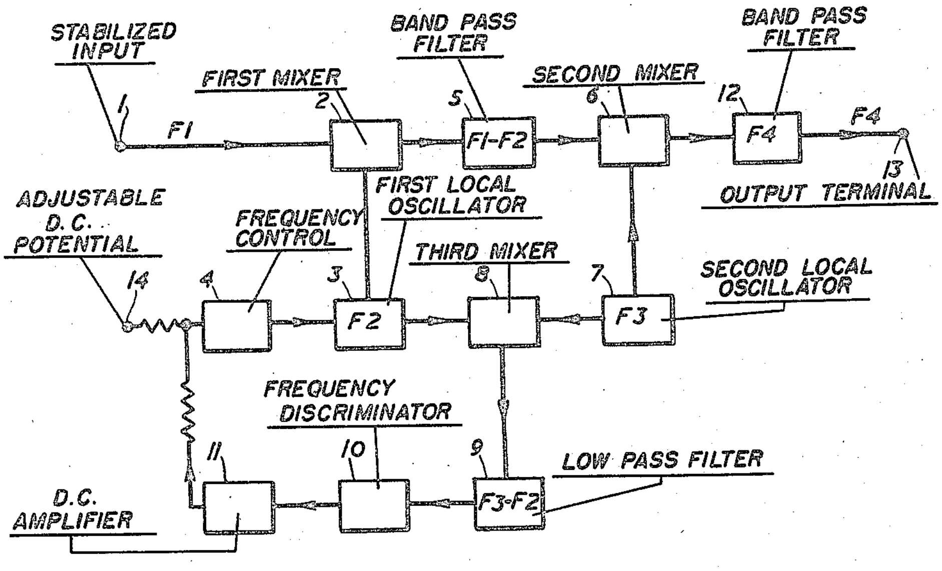
INVENTOR:
Wilfrid Sinden Mortley
BY:
Baldwin & Wight
ATTORNEYS United States Patent Office 2,882,394
Patented Apr. 14, 1959

2,882,394

FREQUENCY CHANGING CIRCUIT ARRANGEMENTS

Wilfrid Sinden Mortley, Great Britain, England, assignor to Marconi's Wireless Telegraph Company Limited, London, England, a company of Great Britain Application May 6, 1957, Serial No. 657,384

Claims priority, application Great Britain May 31, 1956

5 Claims. (Cl. 250—20)

This invention relates to frequency changing circuit arrangements and has for its object to provide improved frequency changing circuit arrangements adapted to deliver from a given input frequency an output frequency differing therefrom by an amount which is small in relation to said input frequency.

It is often required, notably though not exclusively in frequency measuring instruments, to change a given input frequency—for example a stabilized input frequency from a thermostatically controlled crystal oscillator—to an output frequency which differs therefrom by an amount which, though small in relation to said input frequency, is accurately of a predetermined value. It is often required that the value of the difference shall be adjustable, with maintenance of said value accurately to the adjusted quantity. Thus, for example, in a frequency measuring instrument comprising a stabilized crystal generator of 10,000 kc./s. it may be required to provide a frequency generator which will change the generated frequency into any adjusted value between 10,001 and 10,002 kc./s. and to maintain the chosen adjusted frequency with an accuracy of about 1 part in a million. It is exceedingly difficult with known arrangements to satisfy such a requirement because, owing to the small value of the difference between the input and the ouput frequencies, ordinary filtering methods of frequency separation are exceedingly difficult to apply. Again changes in ambient conditions, notably in temperature, make the stabilization of the frequency difference very difficult to obtain without expensive, high precision filters and local oscillators. The present invention seeks to solve the foregoing difficulties and to provide a frequency changer which will satisfy the requirements without involving the use of expensive, high precision filters or elaborate thermostatic control apparatus.

According to this invention a frequency changer adapted to charge an input frequency into an output frequency differing therefrom by an amount which is small in relation thereto comprises in combination a first mixer; a first local oscillator; means for applying the input frequency and output from said first oscillator to said first mixer; means for selecting one of the two beat frequencies produced by said first mixer; a second mixer; a second local oscillator having a nominal frequency differing from that of the first oscillator by a small amount; means for applying the selected beat frequency and output from the second oscillator to the second mixer; means for selecting one of the two beat frequencies produced in said second mixer and feeding the same to an output terminal; a third mixer; means for applying outputs from the two local oscillators to said third mixer; means for selecting the difference beat frequency produced in said third mixer from the sum frequency beat produced thereby; and means responsive to the frequency of the said difference beat frequency for controlling the frequency of at least one of said local oscillators automatically to maintain said difference beat frequency closely at a predetermined value, the beat frequencies selected from those produced by the first and second mixers being the sum beat frequency in one case and the difference beat frequency in the other.

Preferably the difference beat frequency is selected from the output of the first mixer and the sum beat frequency is selected from the output of the second.

Either one oscillator may be controlled in frequency or both oscillators may be simultaneously controlled in opposite directions.

Preferably the means for automatically controlling local oscillator frequency comprise a frequency discriminator fed with the difference beat frequency from the third mixer and adapted to provide a D.C. output of value dependent on said difference beat frequency, and means controlled by said D.C. output for controlling the reactance in at least one oscillator frequency determining circuit. If it is required to provide control of the difference between the final output frequency and the input frequency, means may be provided for superimposing an adjustable D.C. potential on the output from the frequency discriminator and/or for varying, manually or otherwise, a variable tuning reactor in either of the oscillators.

The invention is illustrated in the accompanying drawings which shows, in block diagram form, one embodiment thereof suitable for use, for example, in a frequency measuring instrument. In describing this embodiment typical practical values of frequency will be given, but it is to be understood that these are by way of example only and in no sense limiting.

Referring to the drawing, a stabilized input frequency F1 of 10,000 kc./s. and derived, for example, from a thermostatically controlled crystal generator (not shown) is applied at the input terminal 1 to a first frequency changing mixer 2 whose second input is taken from a first local oscillator 3 having a frequency F2 which may be controlled over the range 3998 to 3999 kc./s. by a reactance valve or other known frequency control device represented by the rectangle 4.

The output from the mixer 2 is fed to a band pass filter 5 and having its band pass centered at 6000 kc./s. and thus adapted to select the difference beat frequency produced by the mixer 2. The selected beat is fed to a second mixer 6 to which oscillations from a second local oscillator 7, having a nominal frequency F3 of 4000 kc./s., are also fed.

The outputs from the oscillators 3 and 7 are also fed to a third mixer 8, the difference beat frequency of which will be of low value because of the small difference between the oscillator frequencies. The difference beat is selected from the sum frequency beat by a low pass filter 9 having a pass band of 0 to 2 kc./s. and fed to any known form of frequency discriminator 10 adapted to provide a D.C. output of values as nearly as possible linearly related to the output frequency from the filter 9. This D.C. output, after amplification if required in a D.C. amplifier 11, is applied in manner well known per se to control the reactance represented by a known reactance valve circuit 4 connected to present controlled reactance in a frequency determining circuit of the oscillator 3.

The sum beat frequency from the second frequency changer 6 is selected from the difference beat by a band pass filter 12 centered at about 10,000 kc./s. and fed to an output terminal 13 where an output frequency F4 appears.

Control of the stabilized difference between the output frequency F4 and the input frequency F1 may be obtained by superimposing upon the D.C. potential from amplifier 11 an adjustable D.C. potential which is applied at terminal 14 to the reactance valve circuit 4. If the potential applied at terminal 14 is zero the control loop round path 8—9—10—11—4 to the oscillator 3 will operate to tend to maintain the difference between the two oscillator frequencies F2 and F3 constant. If, however, a superimposed D.C. potential is applied at terminal 14 the said loop will operate to maintain the difference between the oscillator frequencies at some value other than zero dependent upon the applied voltage at 14.

It will be seen that the output frequency F4 will be equal to $F1+F3-F2$ and that $F3-F2$ will be maintained at a value which can be adjusted by adjusting the potential applied at terminal 14. The adjusted value of the difference $F3-F2$ will have, without the control loop, some inherent instability due to ambient temperature changes and other causes. The control loop will reduce this instability approximately in the ratio of loop gain at the same time increasing, in the same ratio, the required variation of controlling voltage for a given frequency shift. It will be observed that none of the filters in the frequency changer has to separate closely adjacent frequencies or need be critical in operation or of precise design.

I claim:

1. A frequency changer adapted to change an input frequency into an output frequency differing therefrom by an amount which is small in relation thereto comprising in combination a first mixer; a first local oscillator; means for applying the input frequency and output from said first oscillator to said first mixer; means for selecting one of the two beat frequencies produced by said first mixer; a second mixer; a second local oscillator having a nominal frequency differing from that of the first oscillator by a small amount; means for applying the selected beat frequency and output from the second oscillator to the second mixer; means for selecting one of the two beat frequencies produced in said second mixer and feeding the same to an output terminal; a third mixer; means for applying outputs from the two local oscillators to said third mixer; means for selecting the difference beat frequency produced in said third mixer from the sum frequency beat produced thereby; a frequency discriminator, means for feeding the difference beat frequency from said third mixer to said frequency discriminator, the output from the discriminator being fed to at least one oscillator frequency determining circuit, whereby said difference beat frequency is maintained at a predetermined value, the beat frequencies selected from those produced by the first and second mixers being the sum beat frequency in one case and the difference beat frequency in the other.

2. A frequency changer as set forth in claim 1 wherein the difference beat frequency is selected from the output of the first mixer and the sum beat frequency is selected from the output of the second.

3. A frequency changer as set forth in claim 1 wherein one oscillator is controlled in frequency.

4. A frequency changer as set forth in claim 1 wherein the means for automatically controlling local oscillator frequency comprise a frequency discriminator fed with the difference beat frequency from the third mixer and adapted to provide a D.C. output of value dependent on said difference beat frequency, and means controlled by said D.C. output for controlling the reactance in at least one oscillator frequency determining circuit.

5. A frequency changer as set forth in claim 1 wherein means are provided for superimposing an adjustable D.C. potential upon the output from the frequency discriminator whereby control is provided of the difference between the final output frequency and the input frequency.

References Cited in the file of this patent

UNITED STATES PATENTS 2,270,023 Ramsay et al. ---------- Jan. 13, 1942